(12) United States Patent
Vogt et al.

(10) Patent No.: US 12,277,427 B2
(45) Date of Patent: Apr. 15, 2025

(54) GRAPHICAL USER INTERFACES FOR EXPLORING AND INTERACTING WITH DISTRIBUTED SOFTWARE APPLICATIONS

(71) Applicant: Red Hat, Inc., Raleigh, NC (US)

(72) Inventors: Christian Vogt, Stittsville (CA); Serena Nichols, Uxbridge, MA (US); Jeffrey Phillips, Webster, MA (US); Steven Speicher, Holly Springs, NC (US); Veethika Mishra, Bangalore (IN)

(73) Assignee: Red Hat, Inc., Raleigh, NC (US)

( * ) Notice: Subject to any disclaimer, the term of this patent is extended or adjusted under 35 U.S.C. 154(b) by 515 days.

(21) Appl. No.: 17/070,511

(22) Filed: Oct. 14, 2020

(65) Prior Publication Data
US 2022/0113993 A1   Apr. 14, 2022

(51) Int. Cl.
*G06F 9/451* (2018.01)
*G06F 3/04817* (2022.01)
(Continued)

(52) U.S. Cl.
CPC .......... *G06F 9/451* (2018.02); *G06F 3/04817* (2013.01); *G06F 8/75* (2013.01); *H04L 41/14* (2013.01); *H04L 41/22* (2013.01)

(58) Field of Classification Search
CPC ........ G06F 9/451; G06F 3/04817; G06F 8/75; H04L 41/14; H04L 41/22
See application file for complete search history.

(56) References Cited

U.S. PATENT DOCUMENTS

2005/0132026 A1* 6/2005 Govil ...................... H04L 41/12
709/220
2007/0078988 A1* 4/2007 Miloushev ............. H04L 69/32
709/227
(Continued)

FOREIGN PATENT DOCUMENTS

CN       107741875 B    8/2018
CN       109408064 A    3/2019
(Continued)

OTHER PUBLICATIONS

"Visualize Kubernetes Networking with Goldpinger," Bloomberg Finance L.P., Dec. 13, 2018, https://www.techatbloomberg.com/blog/visualize-kubernetes-networking-goldpinger/.
(Continued)

*Primary Examiner* — Cesar B Paula
*Assistant Examiner* — John M Heffington
(74) *Attorney, Agent, or Firm* — Kilpatrick Townsend & Stockton LLP (57) ABSTRACT

A graphical user interface described herein can allow a user to easily explore and interact with a complex software application in a distributed computing environment. In one example, a system can generate a graphical user interface (GUI) for display on a display device. The GUI can depict a topological view of a group of software components of a distributed software application in a distributed computing environment. The topological view can include a group of nodes representing the group of software components. Each node in the group of nodes can represent a software component and have a status indicator for at least one container pod including the software component. The topological view can also include at least one link between the group of nodes, where the at least one link represents at least one relationship among the group of software components.

20 Claims, 6 Drawing Sheets

(51) Int. Cl.
*G06F 8/75* (2018.01)
*H04L 41/14* (2022.01)
*H04L 41/22* (2022.01)

(56) References Cited

U.S. PATENT DOCUMENTS

| | | | |
|---|---|---|---|
| 2008/0201705 A1* | 8/2008 | Wookey | G06F 8/658 |
| | | | 717/175 |
| 2009/0112932 A1* | 4/2009 | Skierkowski | G06Q 10/06 |
| 2014/0089818 A1* | 3/2014 | Andler | G06F 3/0484 |
| | | | 715/753 |
| 2016/0182498 A1* | 6/2016 | Straka | G06F 3/0619 |
| | | | 711/114 |
| 2020/0133795 A1 | 4/2020 | Rhodes et al. | |
| 2021/0397429 A1* | 12/2021 | Gonzalez | G06F 8/65 |

FOREIGN PATENT DOCUMENTS

| CN | 111158856 B | 5/2020 |
|---|---|---|
| CN | 111367618 A | 7/2020 |

OTHER PUBLICATIONS

"Konstellate," GitHub, Inc., 2020, https://github.com/containership/konstellate.

* cited by examiner

GRAPHICAL USER INTERFACES FOR EXPLORING AND INTERACTING WITH DISTRIBUTED SOFTWARE APPLICATIONS

TECHNICAL FIELD

The present disclosure relates generally to graphical user interfaces. More specifically, but not by way of limitation, this disclosure relates to graphical user interfaces for exploring and interacting with distributed software applications.

BACKGROUND

There are various types of distributed computing environments, such as cloud computing environments, computing clusters, and data grids. Among these, cloud computing environments have become increasingly popular. Cloud computing environments have a shared pool of computing resources (e.g., servers, storage, and virtual machines) that are used to provide services to developers on demand. These services are generally provided according to a variety of service models, such as Infrastructure as a Service, Platform as a Service, or Software as a Service. But regardless of the service model, cloud providers manage the physical infrastructures of the cloud computing environments to relieve this burden from developers, so that the developers can focus on deploying software applications.

One type of software application that is commonly deployed in a distributed computing environment is a distributed software application. A distributed software application includes multiple self-contained software services (e.g., microservices or serverless functions) designed to be deployed individually from one another and to communicate with one another over a network for effectuating the overall functionality of the software application. Distributed software applications can also rely on other software resources running in the distributed computing environment to operate. Examples of such software resources can include webservers, database applications such as MongoDB, load balancers, cron jobs, eventing sources such as Knative Eventing sources, programming-language interpreters such as PHP or Python interpreters, runtime environments such as NodeJS or OpenJDK, and software-defined networking controllers. Distributed software applications can provide improvements to scalability, robustness, isolation, and development time as compared to conventional monolithic applications.

DETAILED DESCRIPTION

Distributed software applications are becoming increasingly complex. For example, a single distributed software application may rely on dozens or hundreds of individual software components (e.g., software services or software resources) working in concert to operate. The complexity of distributed software applications and the numerous relationships among all of their constituent software components can make it challenging for a developer to fully understand, manage, and update such software applications. This can be particularly true in situations where a developer charged with maintaining or updating a distributed software application is different from the developer that originally built the distributed software application.

Some examples of the present disclosure can overcome one or more of the abovementioned problems by providing a graphical user interface (GUI) with a topological view of software components that form a distributed software application. The topological view can have nodes representing the software components and lines between the nodes representing relationships among the software components. The topological view can allow developers to better comprehend a distributed software application by providing a more holistic, application-centric visualization of the overall application structure.

The GUI can also provide other information about the distributed software application and its software components. For example, the GUI can provide resource-consumption information relating to the software components, network-traffic information relating to the software components, build information relating to the software components, routing information relating the software components, and pod-status information relating to the software components. Pod-status information can be status information about a container pod ("pod") associated with a software component, where a pod is a higher level abstraction of a grouping of containerized elements that typically share resources and may be co-located on the same host machine. The above types of information can assist developers with monitoring the distributed software applications and debugging problems that may arise. A developer may be able to interact with the GUI, such as by clicking on the nodes representing the software components, to selectively receive such information as desired.

The GUI may also allow a developers to create and update a distributed software application through a drag-and-drop interface. A developer can use the drag-and-drop interface to drag nodes representing software components into or out of a bounded area depicted in the GUI. The bounded area can visually define the distributed software application in the GUI. By dragging nodes into or out of the bounded area, the developer can customize (e.g., add software components to or remove software components from) the software application. The underlying computing system can detect such drag-and-drop operations and responsively communicate with the distributed computing environment to update the distributed software application in accordance with the developer's customizations. This can allow developers to quickly and easily customize a distributed software application in a distributed computing environment, without having to understand the inner workings of the distributed computing environment.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
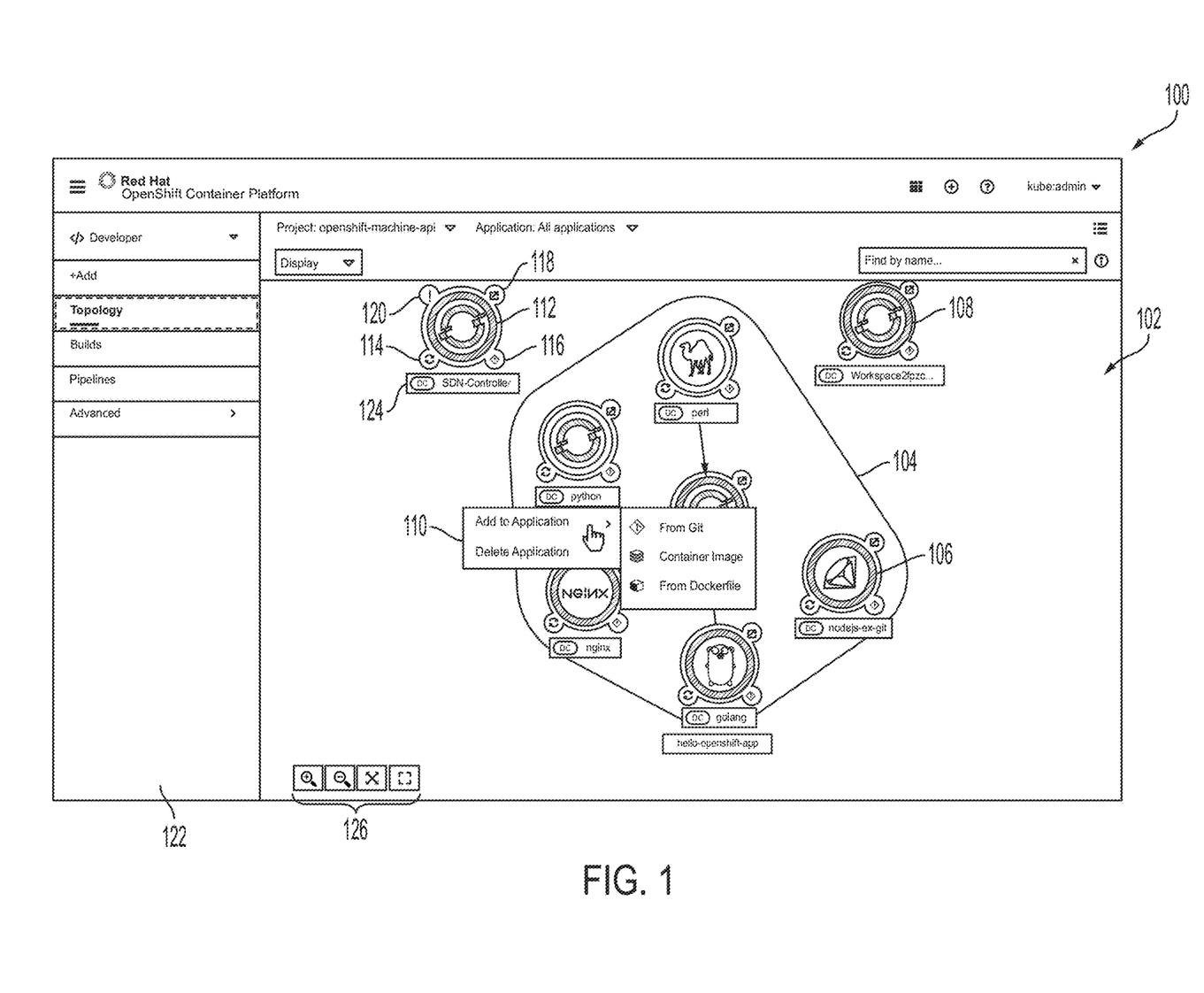
FIG. 1 shows an example of a graphical user interface according to some aspects of the present disclosure.

FIG. 1 shows an example of a graphical user interface (GUI) 100 for exploring and interacting with a distributed software application according to some examples of the present disclosure. The GUI 100 may be generated by a computing device (e.g., a server, desktop computer, laptop computer, mobile phone, or tablet). As shown in FIG. 1, the GUI 100 includes a canvas region 102 that depicts a topology view of software components of the distributed software application. The topology view includes nodes with icons to represent the software components. Different icons can represent different types of software components. The topology view also includes links (e.g., lines or other connections) between the nodes to represent relationships between the software components. In some examples, a link between two nodes can represent data-communication capabilities between the corresponding software components. The link may have an arrowhead at one or both ends to indicate a direction of data flow between the software components. Such a topology view may allow a developer to easily visualize a complex distributed software application, which can assist the developer in better understanding how the distributed software application operates and can aid the developer in debugging problems that may arise.

A bounded area 104 inside the canvas region 102 can define which software components are part of the distributed software application. For example, a first node 106 is depicted as internal to the bounded area 104 to indicate that its corresponding software component is part of the distributed software application, while a second node 108 is depicted as external to the bounded area 104 to indicate that its corresponding software component is not part of the distributed software application.

The GUI 100 can allow a user to drag-and-drop nodes in the canvas region 102 for adding their corresponding software components to, or removing their corresponding software components from, the distributed software application. For example, a user can drag-and-drop the second node 108 from outside the bounded area 104 to within the bounded area 104. The computing device can detect the drag-and-drop operation and responsively communicate with the distributed computing environment to add a software component associated with the second node 108 to the distributed software application. Communicating with the distributed computing environment may involve transmitting one or more commands to an application programming interface (API) of the distributed computing environment. For instance, the computing device can transmit a command to an API of the distributed computing environment for causing the distributed computing environment to establish a service connection between the software component corresponding to the second node 108 and another software component of the distributed software application. A service connection can allow for data communications between the software components. As another example, the user can drag-and-drop the first node 106 from within the bounded area 104 to outside the bounded area 104. The computing device can detect the drag-and-drop operation and responsively communicate with the distributed computing environment to remove a software component associated with the first node 106 from the distributed software application. For instance, the computing device can transmit a command to an API of the distributed computing environment for causing the distributed computing environment to close a service connection between the software component corresponding to the second node 108 and another software component of the distributed software application.

In some examples, software components can also be added to the distributed software application in other ways. For example, the user can interact with (e.g., right click on) the bounded area 104 to trigger a menu 110 that has an option to add a software component to the distributed software application. In the example shown in FIG. 1, the GUI 100 allows for the software component to be added from any one of a variety of sources, such as from a GitHub repository, a container image, a developer catalog, a Dockerfile, or YAML/JSON definitions. A user can select one of the sources and the computing device can responsively prompt the user to enter a location (e.g., a uniform resource locator or filesystem location) from which the software component can be retrieved. The computing device can then communicate the source location to the distributed computing environment for causing the distributed computing environment to obtain the software component from the source location and deploy the software component as part of the distributed software application. The computing device can also visually update the bounded area 104 to include a new node representing the added software component. As another example, a user can select the "+Add" option from the left-hand navigation bar 122 to add a software component to the distributed software application. In response, the computing device can prompt the user to enter a location from which the software component can be retrieved. The computing device can then communicate with the distributed computing environment to deploy the new software component as part of the distributed software application and visually update the GUI 100, for example as described above.

In some examples, the GUI 100 can allow a user to add links between nodes in the canvas region 102 for enabling the corresponding software components to interact with one another in the distributed computing environment. For example, a user can draw an arrow between two nodes in the bounded area 104 of the GUI 100. The computing device can detect the draw operation and responsively communicate with the distributed computing environment to generate a service connection between the software components corresponding to the nodes. If the arrow is a single-headed arrow, then the service connection may only allow data to flow in one direction. If the arrow is double-headed, then the service connection may allow data to flow bidirectionally. One particular example can involve creating a service connection between software components of a distributed software application deployed on the OpenShift container platform ("OpenShift") by Red Hat®. To create the service connection, a Service Binding Request can be generated as a custom resource on OpenShift and a Service Binding Operator Controller of OpenShift can be used to inject the service-connection information into the distributed software application as environment variables (e.g., using an intermediate Secret). But there are also other possible ways to generate a service connection in OpenShift.

The GUI 100 can allow a user to delete links between nodes in the canvas region 102 for preventing the corresponding software components from interacting with one another in the distributed computing environment. For example, the user can delete a link between two nodes in the bounded area 104 of the GUI 100. The computing device can detect the deletion operation and responsively communicate with the distributed computing environment to close a service connection between the corresponding software components.

In some examples, the GUI 100 can allow the user to delete the distributed software application from the distributed computing environment. For example, the user can select the "Delete Application" option from the menu 110 shown in FIG. 1 to delete the entire distributed software application. In response, the computing device can communicate with the distributed computing environment for causing the distributed computing environment to shutdown some or all of the constituent software components of the distributed software application and perform other operations to shutdown the distributed software application. The computing device can also visually update the GUI 100 to remove the bounded area 104 and the nodes therein from the canvas region 102, to indicate that the software component has been deleted.

In some examples, each of the nodes can have a status indicator, such as status indicator 112. The status indicator 112 can include one or more colored regions indicating one or more statuses associated with a corresponding software component. In the example shown in FIG. 1, the status indicator 112 is a ring that can change colors to indicate one or more statuses of one or more pods running the corresponding software component in the distributed computing environment. For example, the computing device can set the ring's color to light blue if the pod is starting up, to dark blue if the pod is running, to yellow if the pod is shutting down, or to red if the pod has an error. But other color schemes are possible. Any suitable color scheme can be used to indicate any status or combination of statuses associated with the software component to a user.

One or more tool icons can also be positioned adjacent to each node. The tool icons can include a first tool icon 114 that can be selected (e.g., clicked or hovered over) by the user for accessing build logs associated with a software component corresponding to the node. For example, the computing device can detect a user interaction with the first tool icon 114 and responsively output a build log relating to a build process for building the software component. The tool icons can also include a second tool icon 116 that be selected by the user for accessing a website that is hosting program code for the corresponding software component. For example, the computing device can detect a user interaction with the second tool icon 116 and responsively launch a website browser directed to a GitHub repository hosting the source code for the software component. The tool icons can further include a third tool icon 118 that can be selected by the user for accessing a public endpoint for the corresponding software component. For example, the computing device can detect a user interaction with the third tool icon 118 and responsively launch a website browser directed to uniform resource locator (URL) serving as a publicly accessible endpoint for the software component. The tool icons can also include a fourth tool icon 120 that is selectable for accessing alert information associated with the corresponding software component. For example, the computing device can detect a user interaction with the fourth tool icon 120 and responsively display a window with one or more alerts relating to the software component, such as an alert that a build process for building the software component failed or an alert that the software component has become unreachable. It will be appreciated that these tool icons are intended to be illustrative and non-limiting. Other examples may include more, fewer, or different tool icons than those described above.

Each node can also have a name label, such as name label 124. The name label may be a default label or a user-specified label. For example, each node may begin with a default name-label that a user can subsequently edit as desired. A user can select a name label 124 to edit it. Upon the user selecting a name label 124, the computing device may generate a text box in place of the name label 124, where the text box includes the label's text so that user can edit it. Once the user is done editing the label's text, the user can select a save button to update the name label. The computing device can responsively save the name label and update the GUI 100 to reflect the new name label. In this way, the user can customize the name label of each node in the topological view. This may assist the user in remembering which software component is represented by each node, or may aid future users in understanding the nodes and the relationships between the nodes.

The canvas region 102 can also include additional icons 126 that allow the user to zoom in on the canvas region 102, zoom out on the canvas region 102, expand the size of the canvas region 102 (e.g., to full screen), and perform other functionality in relation to the canvas region 102 or bounded area 104.

Figure 2:
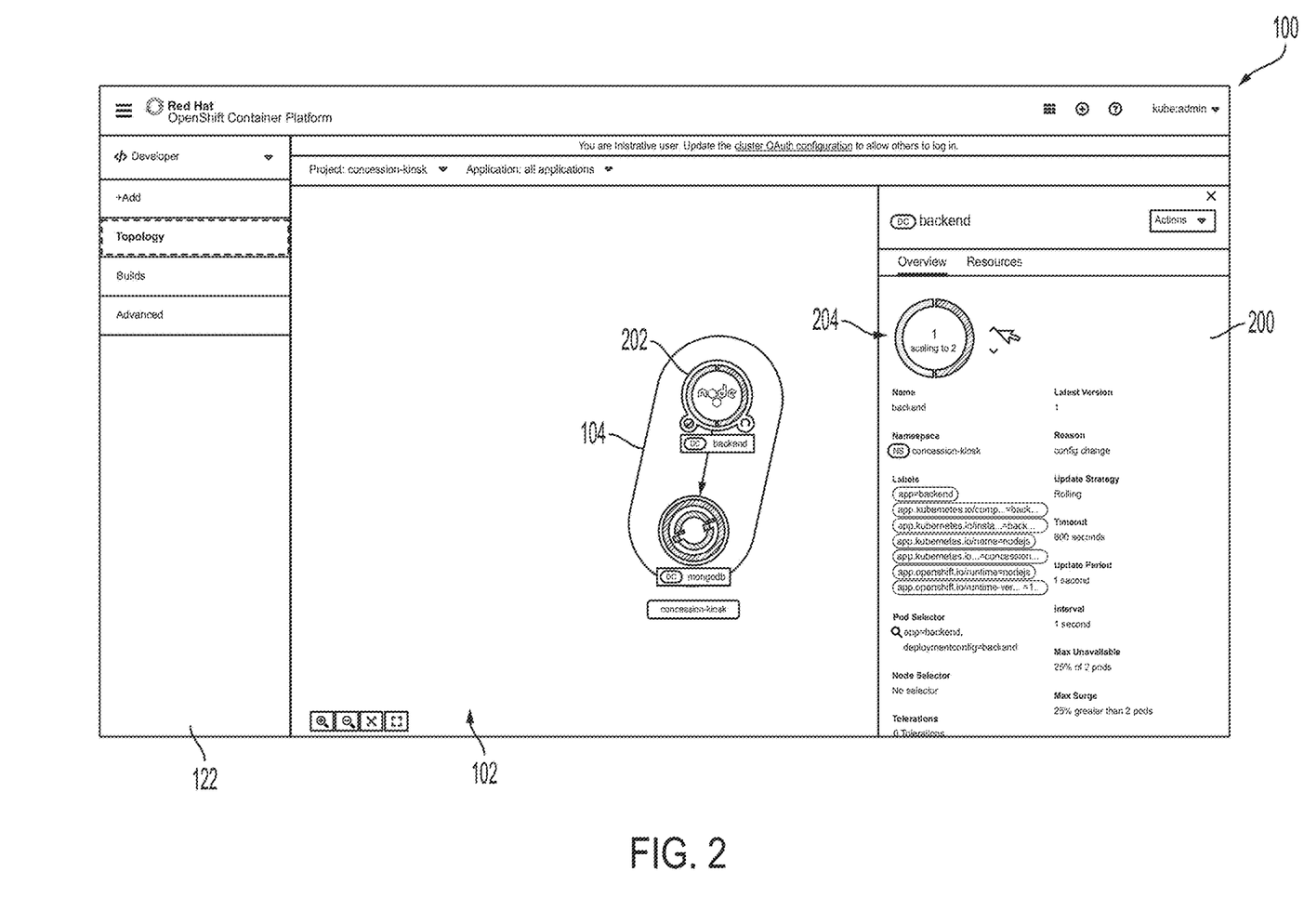
FIG. 2 shows an example of an overview tab of a graphical user interface according to some aspects of the present disclosure.

In some examples, a user can select a node to open a panel with more information and options relating to the node. One example of such a panel 200 is shown in FIG. 2. In the example shown in FIG. 2, a user has selected node 202 and the computing device has responsively displayed the panel 200 in the GUI 100. Although the panel 200 is depicted as being on the right-hand side of the GUI 100, in other examples the panel 200 can be located elsewhere in the GUI 100. Alternatively, the panel's content can be included elsewhere in the GUI 100 in other examples, such as in a popup window or another type of graphical object.

As shown in FIG. 2, the panel 200 can an "Overview" tab and a "Resources" Tab. The "Overview" tab can provide various types of information about the software component represented by the node 202. Examples of such information include the name label assigned to the node, the namespace of the software component, other labels assigned to the software component, the latest version of the software component, an update strategy for the software component, a timeout parameter of the software component, an update period for the software component, etc. The computing device can interact with the distributed computing environment to determine some or all of this information for generating the "Overview tab."

The "Overview" tab can also include various options associated with the software component. One such option is the ability to increase or decrease the number of pods running the software component. In the example shown in FIG. 2, the user has selected an up arrow to increase the number of pods running the software component from one to two. In response, the computing device has communicated with the distributed computing environment for causing the distributed computing environment to deploy another pod for running the software component. The computing device has also updated a progress indicator 204 to indicate a deployment status of the pods. In particular, the computing device has divided the progress indicator 204 into two distinct colored-regions indicating the deployment statuses of the pods. The darker-colored portion on the right-hand side of the progress indicator 204 indicates that one pod is already deployed. The lighter-colored portion on the left-hand side of the progress indicator 204 indicates that another pod is still in the process of being deployed. While the progress indicator 204 shown in FIG. 2 is a colored ring that is segmented into two colored regions indicating two statuses of two pods, the progress indicator can be any suitable graphical object segmented into any number and combination of colored regions to indicate deployment statuses for any number and combination of pods. Using these interactive features, a user can easily scale (e.g., up or down) the software component and receive real-time progress information via the progress indicator 204.

Figure 3:
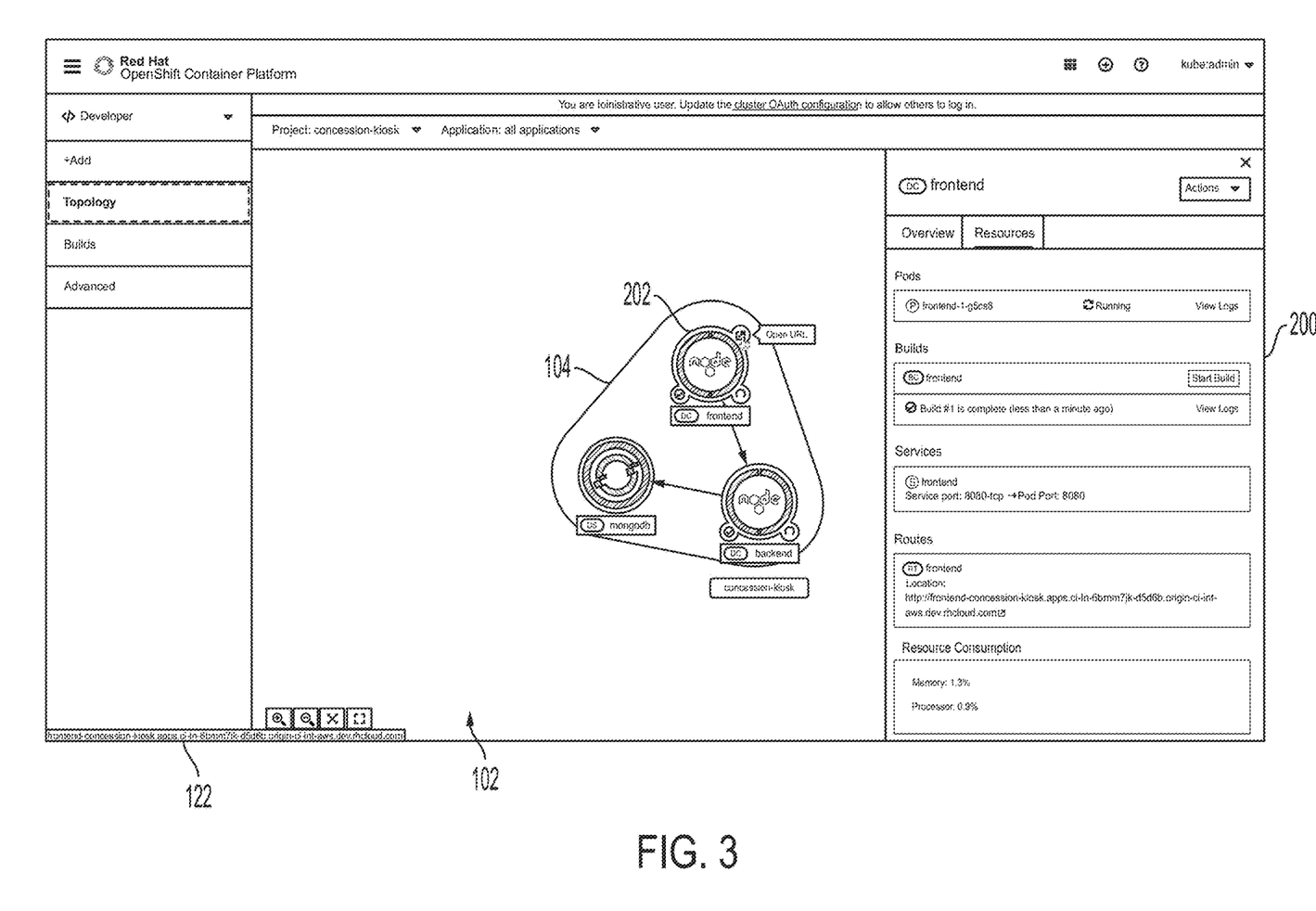
FIG. 3 shows an example of a resources tab of a graphical user interface according to some aspects of the present disclosure.

As noted above, the panel 200 can also include a "Resources" tab. One example of the "Resources" tab is shown in FIG. 3. As shown, this tab can include information about the pods, builds, services, routes (e.g., publicly accessible end-points for a software component), resource-consumption levels, or any combination of these, associated with the software component represented by node 202. In particular, the tab can include the status of each pod that is running the software component along with a selectable object for viewing logs associated with the pod. In FIG. 3, the status of the pod is "running" and the selectable object is a text object that says "View Logs." The tab can also include a build status associated with the distributed software application along with a selectable object for viewing logs associated with the build. In FIG. 3, the status of the build is "complete (less than a minute ago)" and the selectable object is a text object that says "View Logs." A button is also included for initiating a build of the software component. The tab can further include service information such as a service port and a pod port associated with the software component. In FIG. 3, the service port is 8080 and the pod port is 8080. The tab can additionally include route information indicating end points for the software component. In FIG. 3, the route information is a URL that is accessible via a website browser. The tab can further include resource-consumption information, such as memory-usage information and processor-usage information. In FIG. 3, the resource-consumption information indicates that the software component is using 1.3% of memory and 0.9% of processing power. Of course, these examples are intended to be illustrative and non-limiting. In other examples, the "Resource tab" can include more information, less information, or different information than described above. The computing device can interact with the distributed computing environment to determine some or all of this information for generating the "Resources tab."

Figure 4:
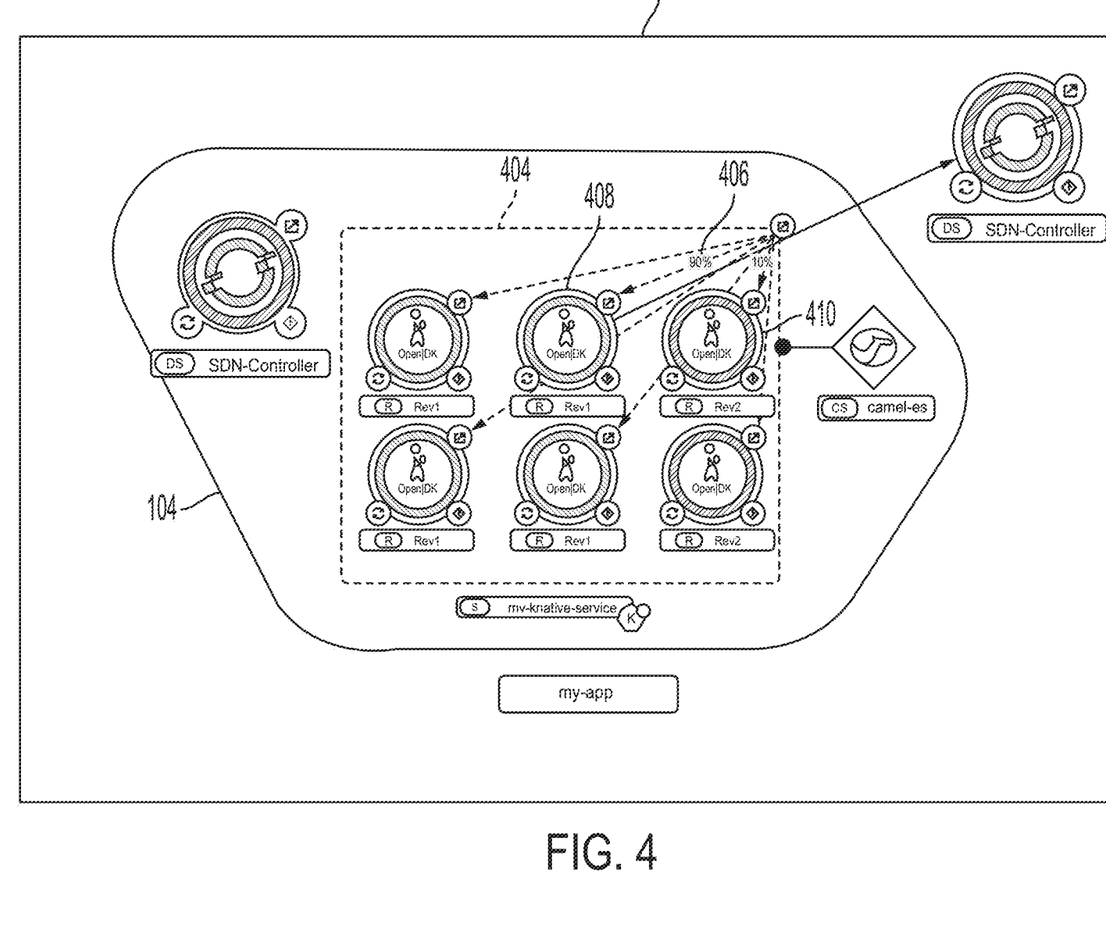
FIG. 4 shows an example of a graphical user interface with network-traffic information according to some aspects of the present disclosure.

In some examples, the GUI 100 can also include network traffic information. One such example is shown in FIG. 4. FIG. 4 depicts a bounded area 104 with nodes representing software components of a distributed software application. Within the bounded area 104 is a subgrouping 404 of nodes. In the example shown in FIG. 4, the subgrouping 404 is an active-traffic grouping. The active-traffic grouping includes nodes representing different revisions (e.g., versions) of the same software component and indicates how network traffic is to flow among the different revisions. More specifically, the subgrouping 404 includes four nodes associated with a first revision of the software component and two nodes associated with a second revision of the software component. There are also dashed arrows pointing to each of the nodes in the subgrouping 404, where some of the dashed arrows have numerical values adjacent to them. The numerical values can represent amounts of network traffic to be directed to the corresponding software components. For example, an arrow pointing to node 408 includes a numerical value 406 of 90%, indicating that 90% of the network traffic to the subgrouping 404 is to be directed to the software component corresponding to node 408. And an arrow pointing to node 410 includes a numerical value of 10%, indicating that 10% of the network traffic to the subgrouping 404 is to be directed to the software component corresponding to node 410. The other nodes in the subgrouping 404 to which no network traffic is to be directed may lack corresponding numerical values. By providing network traffic information right within the topological view, a user may be able to quickly understand how network traffic is propagated through the distributed software application, thereby allowing the user to more readily debug problems that may arise.

It will be appreciated that the example GUI 100 and corresponding features shown in FIGS. 1-4 are intended to be illustrative and non-limiting. Other examples may include more features, fewer features, different features, or a different arrangement of the features described above.

Figure 5:
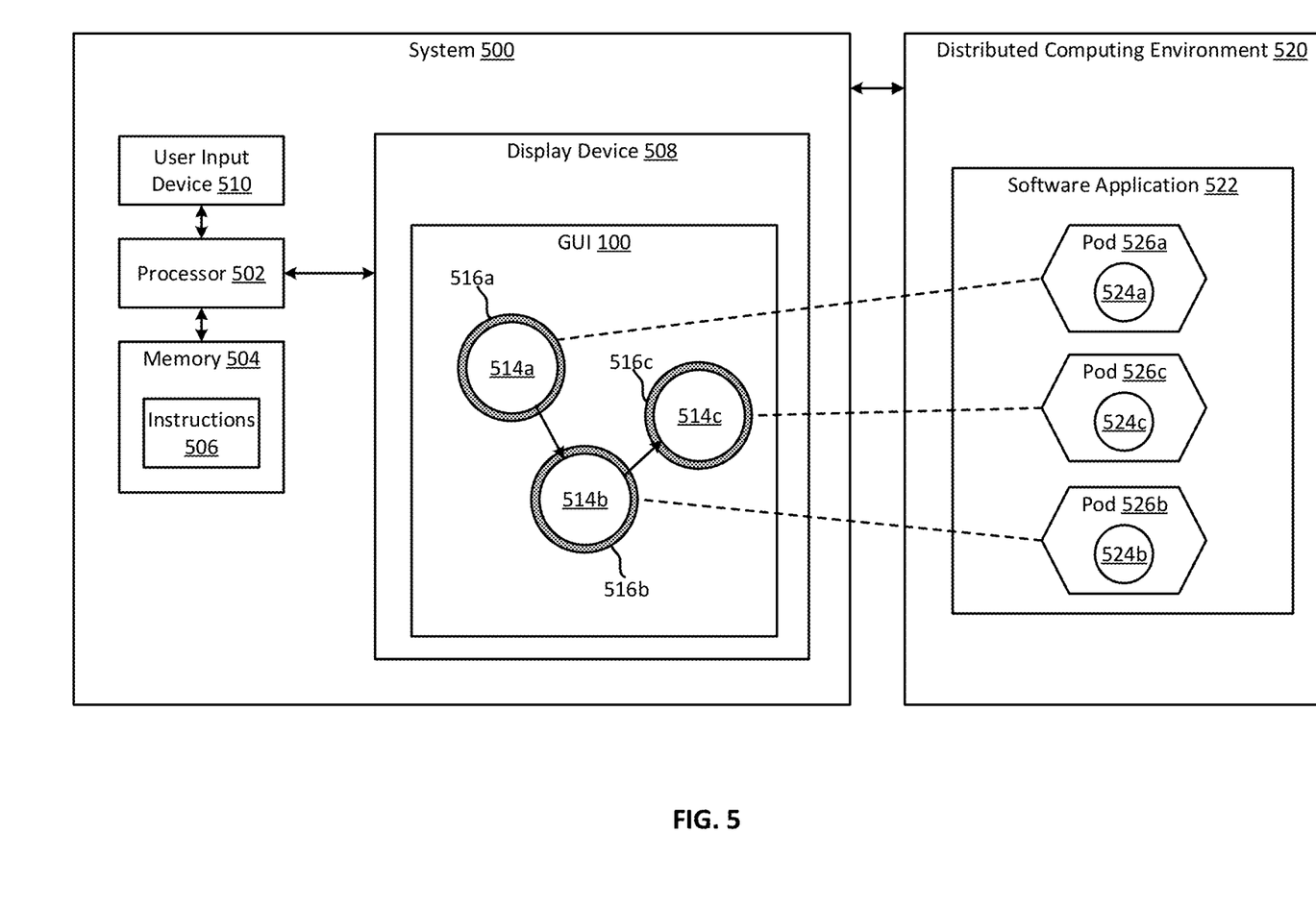
FIG. 5 is a block diagram of a system for generating a graphical user interface according to some aspects of the present disclosure.

The GUI 100 described above may be implemented using a computing device or computing system, such as the system 500 shown in FIG. 5. The system 500 includes a processor 502 communicatively coupled with a memory 504, a display device 508, and a user input device 510. Examples of the display device 508 can include a touch-screen display or a computer monitor. Examples of the user input device 510 can include a mouse, keyboard, touch screen, or touch pad. The processor 302, memory 304, display device 322, and user input device 324 can be parts of the same computing device or they can be distributed from one another.

The processor 502 can include one processor or multiple processors. Non-limiting examples of the processor 502 include a Field-Programmable Gate Array (FPGA), an application-specific integrated circuit (ASIC), a microprocessor, etc. The processor 502 can execute instructions 506 stored in the memory 504 to perform operations. The instructions 506 can include processor-specific instructions generated by a compiler or an interpreter from code written in any suitable computer-programming language, such as C, C++, C#, etc.

The memory 504 can include one memory or multiple memories. Non-limiting examples of the memory 504 can include electrically erasable and programmable read-only memory (EEPROM), flash memory, or any other type of non-volatile memory. At least some of the memory 504 includes a non-transitory computer-readable medium from which the processor 502 can read the instructions 506. The non-transitory computer-readable medium can include electronic, optical, magnetic, or other storage devices capable of providing the processor 502 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 506.

In some examples, the processor 502 can execute the instructions 506 to generate a GUI 100 for display on the display device 508. The GUI 100 can depict a topological view of a plurality of software components 524a-c forming a distributed software application 522 in a distributed computing environment 520. Although the distributed computing environment 520 is depicted as being separate from the system 500 in FIG. 5, in other examples the system 500 may be part of the distributed computing environment 520 or vice-versa.

The topological view can include a plurality of nodes 514a-c representing the plurality of software components 524a-c. Each node in the plurality of nodes 516a-c can represent a software component and have a status indicator for (e.g., indicating a status of) at least one container pod that includes the software component in the distributed computing environment 520. For example, node 514a can represent software component 524a and have a respective status indicator 516a indicating a respective status of a container pod 526a that includes the software component 524a. As another example, node 514b can represent software component 524b and have a respective status indicator 516b indicating a respective status of a container pod 526b that includes the software component 524b. As still another example, node 514c can represent software component 524c and have a respective status indicator 516c indicating a respective status of a container pod 526c that includes the software component 524c. The topological view can also include at least one link between the plurality of nodes 514a-c, where the at least one link can represent at least one relationship among the plurality of software components 524a-c. While the GUI 100 in this example shows a particular number and arrangement of nodes 514a-c and software components 528a-c, it will be appreciated that the GUI 100 can include any number and arrangement of nodes representing any number and combination of software components of a distributed software application.

Figure 6:
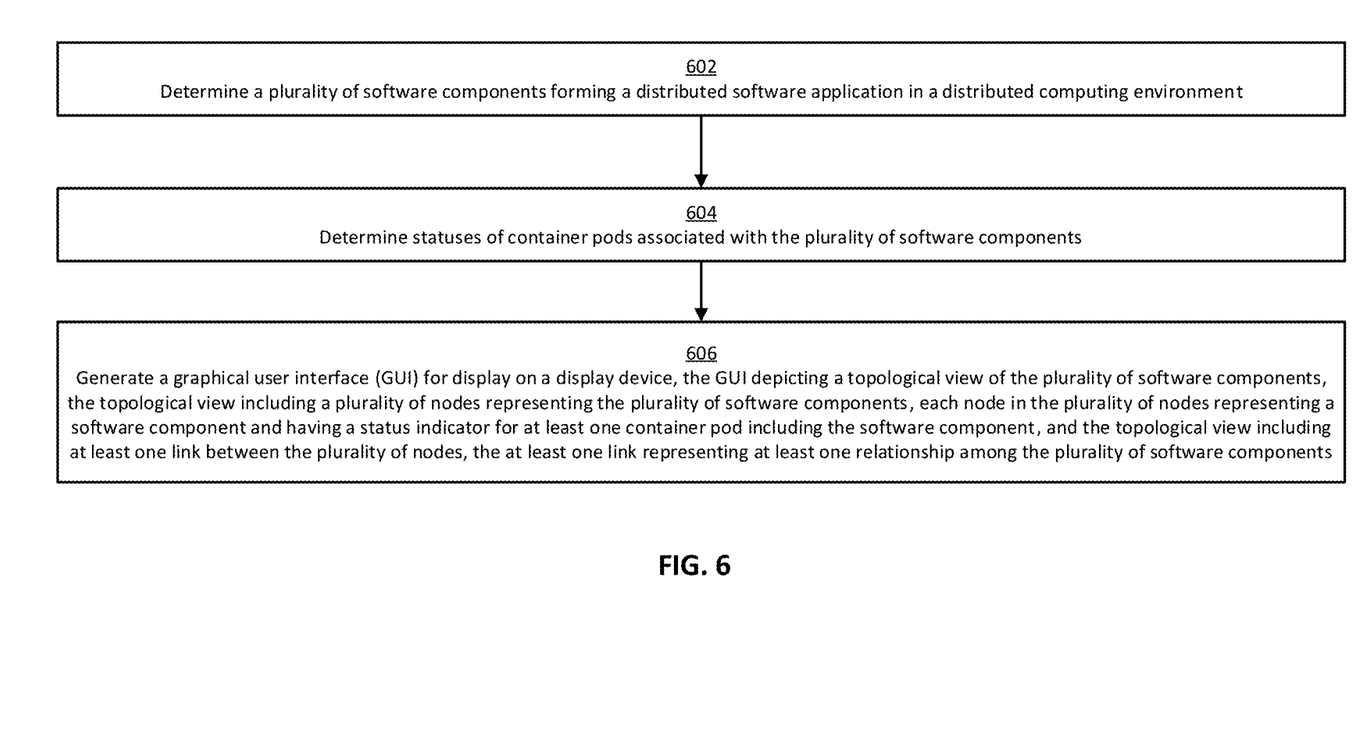
FIG. 6 a flow chart of an example of a process for generating a graphical user interface according to some aspects of the present disclosure.

In some examples, the processor 502 can implement some or all of the steps shown in FIG. 6. Other examples can include more steps, fewer steps, different steps, or a different order of the steps than is shown in FIG. 6. The steps of FIG. 6 are discussed below with reference to the components discussed above in relation to FIG. 5.

In block 602, a processor 502 determines a plurality of software components 528a-c forming a distributed software application 522 in a distributed computing environment 520. In some examples, the processor 502 can determine the plurality of software components 528a-c by communicating with the distributed computing environment 520, which can provide the processor 502 with information about the plurality of software components 528a-c forming the distributed software application 522. Additionally or alternatively, the processor 502 can determine the plurality of software components 528a-c based on user input. For example, a user can interact with the GUI 100 to input which software components are parts of the distributed software application 522.

In block 604, the processor 502 determines statuses of container pods 526a-c associated with the plurality of software components 528a-c. In some examples, the processor 502 can determine the statuses by communicating with the distributed computing environment 520, which can provide the processor 502 with the status information about the container pods 526a-c.

In block 606, the processor 502 generates a GUI 100 for display on the display device 508. The processor 502 can generate the GUI 100 based on the plurality of software components and the statuses. In some examples, the GUI 100 can depict a topological view of the plurality of software components 528a-c. The topological view can include a plurality of nodes 514a-c representing the plurality of software components 524a-c. Each node in the plurality of nodes 516a-c can represent a software component and have a status indicator for at least one container pod including the software component. The topological view can also include at least one link between the plurality of nodes 514a-c, where the at least one link represents at least one relationship among the plurality of software components 524a-c.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
a processor; and
a non-transitory computer-readable medium including instructions that are executable by the processor for causing the processor to:
receive information about a distributed software application formed from a plurality of software components executing within a plurality of container pods of a distributed computing environment, the plurality of container pods being distinct from the plurality of software components; and
based on the information, generate a graphical user interface (GUI) for display on a display device, the GUI including a topological view of a plurality of nodes representing the plurality of software components forming the distributed software application, each node in the plurality of nodes identifying a corresponding software component of the plurality of software components, and each node in the plurality of nodes having a status indicator indicating a number of container pods in which the corresponding software component is running and indicating an operational status of at least one of the container pods in which the corresponding software component is running, and the topological view including at least one link between nodes of the plurality of nodes, the at least one link representing at least one relationship between software components of the plurality of software components, wherein at least one software component in the plurality of software components is runnable in at least two container pods.

2. The system of claim 1, wherein a node of the plurality of nodes includes a corresponding status indicator that is segmented into at least two colored regions indicating at least two statuses of at least two container pods that contain the software component represented by the node.

3. The system of claim 1, wherein the GUI includes tool icons positioned adjacent to a node of the plurality of nodes, the tool icons including (i) a first tool icon that is selectable for accessing build logs associated with a particular software component corresponding to the node, (ii) a second tool icon that is selectable for accessing a website hosting program code for the particular software component, (iii) a third tool icon that is selectable for accessing a public endpoint for the particular software component, and (iv) a fourth tool icon that is selectable for accessing alert information associated with the particular software component.

4. The system of claim 1, wherein the GUI includes a canvas region depicting a set of software components and a bounded area inside the canvas region defining which software components in the set of software components are part of the distributed software application, wherein a first software component in the set of software components is depicted as internal to the bounded area in the canvas region and constitutes part of the distributed software application, and wherein a second software component in the set of software components is depicted as external to the bounded area in the canvas region and is not part of the distributed software application.

5. The system of claim 4, wherein the GUI is configured to enable a user to drag-and-drop a node corresponding to a particular software component into the bounded area of the GUI for adding the particular software component to the distributed software application.

6. The system of claim 1, wherein the GUI is configured to enable a user to create a link between two nodes of the plurality of nodes for establishing data communication between two software components corresponding to the two nodes in the distributed computing environment.

7. The system of claim 1, wherein a node in the plurality of nodes is selectable for opening a panel in the GUI, the panel indicating resource consumption associated with a particular software component corresponding to the node.

8. A computer-implemented method comprising:
receiving information about a distributed software application formed from a plurality of software components executing within a plurality of container pods of a distributed computing environment, the plurality of container pods being distinct from the plurality of software components; and
based on the information, generating a graphical user interface (GUI) for display on a display device, the GUI including a topological view of a plurality of nodes representing the plurality of software components forming the distributed software application, each node in the plurality of nodes identifying a corresponding software component of the plurality of software components, and each node in the plurality of nodes having a status indicator indicating a number of container pods in which the corresponding software component is running and indicating an operational status of at least one of the container pods in which the corresponding software component is running, and the topological view including at least one link between nodes of the plurality of nodes, the at least one link representing at least one relationship between software components of the plurality of software components, wherein at least one software component in the plurality of software components is runnable in at least two container pods.

9. The method of claim 8, wherein a node of the plurality of nodes includes a corresponding status indicator indicating at least two statuses of at least two container pods that contain the software component represented by the node.

10. The method of claim 8, wherein the GUI includes tool icons positioned adjacent to a node of the plurality of nodes, the tool icons including (i) a first tool icon that is selectable for accessing build logs associated with a particular software component corresponding to the node, (ii) a second tool icon that is selectable for accessing a website hosting program code for the particular software component, (iii) a third tool icon that is selectable for accessing a public endpoint for the particular software component, and (iv) a fourth tool icon that is selectable for accessing alert information associated with the particular software component.

11. The method of claim 8, wherein the GUI includes a canvas region depicting a set of software components and a bounded area inside the canvas region defining which software components in the set of software components are part of the distributed software application, wherein a first software component in the set of software components is depicted as internal to the bounded area in the canvas region and constitutes part of the distributed software application, and wherein a second software component in the set of software components is depicted as external to the bounded area in the canvas region and is not part of the distributed software application.

12. The method of claim 11, wherein the GUI is configured to enable a user to drag-and-drop a node corresponding to a particular software component into the bounded area of the GUI for adding the particular software component to the distributed software application.

13. The method of claim 8, wherein the GUI is configured to enable a user to create a link between two nodes of the plurality of nodes for establishing data communication between two software components corresponding to the two nodes in the distributed computing environment.

14. The method of claim 8, wherein a node in the plurality of nodes is selectable for opening a panel in the GUI indicating resource consumption associated with a particular software component corresponding to the node.

15. A non-transitory computer-readable medium comprising program code that is executable by a processor for causing the processor to:
receive information about a distributed software application formed from a plurality of software components executing within a plurality of container pods of a distributed computing environment, the plurality of container pods being distinct from the plurality of software components; and
based on the information, generate a graphical user interface (GUI) for display on a display device, the GUI including a topological view of a plurality of nodes representing the plurality of software components forming the distributed software application, each node in the plurality of nodes identifying a corresponding software component of the plurality of software components, and each node in the plurality of nodes having a status indicator indicating a number of container pods in which the corresponding software component is running and indicating an operational status of at least one of the container pods in which the corresponding software component is running, and the topological view including at least one link between nodes of the plurality of nodes, the at least one link representing at least one relationship between software components of the plurality of software components.

16. The non-transitory computer-readable medium of claim 15, further comprising program code that is executable by the processor for causing the processor to:
determine at least two statuses of at least two container pods that contain a software component of the plurality of software components, the software component being represented by a node of the plurality of nodes; and
based on the at least two statuses, generate the status indicator corresponding to the node in the GUI, the status indicator being segmented into at least two regions indicating the at least two statuses of the at least two container pods.

17. The non-transitory computer-readable medium of claim 15, further comprising program code that is executable by the processor for causing the processor to:
detect a first selection of a first tool icon among a plurality of tool icons positioned adjacent to a node of the plurality of nodes;
in response to detecting the first selection of the first tool icon, output a build log associated with a particular software component corresponding to the node;
detect a second selection of a second tool icon among the plurality of tool icons;
in response to detecting the second selection of the second tool icon, access a website hosting program code for the particular software component;
detect a third selection of a third tool icon among the plurality of tool icons;
in response to detecting the third selection of the third tool icon, access a public endpoint for the particular software component;

detect a fourth selection of a fourth tool icon among the plurality of tool icons; and in response to detecting the fourth selection of the fourth tool icon, output alert information associated with the particular software component.

18. The non-transitory computer-readable medium of claim 15, further comprising program code that is executable by the processor for causing the processor to:

detect a drag-and-drop operation involving a node associated with a particular software component being dropped into a bounded area of the GUI defining which software components are part of the distributed software application; and in response to detecting the drag-and-drop operation, communicate with the distributed computing environment for adding the particular software component to the distributed software application.

19. The non-transitory computer-readable medium of claim 15, further comprising program code that is executable by the processor for causing the processor to:

detect a user input for creating a link between two nodes of the plurality of nodes; and in response to detecting the user input, communicate with the distributed computing environment for establishing data communication between two software components corresponding to the two nodes in the distributed computing environment.

20. The non-transitory computer-readable medium of claim 15, further comprising program code that is executable by the processor for causing the processor to:

detect a user interaction with a node of the plurality of nodes; and in response to detecting the user interaction:

determine resource consumption associated with a particular software component corresponding to the node by communicating with the distributed computing environment; and display a panel in the GUI indicating the resource consumption associated with the particular software component.

\* \* \* \* \*